INVENTOR.
FRANK J. RYBAK
SUMNER H. HAWLEY
BY Woodling + Krost
attys.

INVENTOR.
FRANK J. RYBAK
SUMNER H. HAWLEY
BY
Woodling + Krost
Attys.

Oct. 13, 1964   F. J. RYBAK ETAL   3,152,502
CRANK MEANS FOR RECIPROCATING CUTTER
CARRIAGE AND ACTUATING CUTTER HEAD
Filed Nov. 30, 1961   6 Sheets-Sheet 5

INVENTOR.
FRANK J. RYBAK
SUMNER H. HAWLEY
BY
Woodling & Krost
Attys.

FIG. 10

INVENTOR.
FRANK J. RYBAK
SUMNER H. HAWLEY

United States Patent Office 3,152,502
Patented Oct. 13, 1964

3,152,502
CRANK MEANS FOR RECIPROCATING CUTTER CARRIAGE AND ACTUATING CUTTER HEAD
Frank J. Rybak, Cleveland, and Sumner H. Hawley, Bay Village, Ohio, assignors to Curtis Manufacturing Company, a corporation of Missouri
Filed Nov. 30, 1961, Ser. No. 157,044
10 Claims. (Cl. 83—320)

The invention relates in general to wire or stock cutting machines which are utilized to straighten and cut continuous lengths of stock. The invention relates more particularly to this type of machine wherein a much greater length of wire or stock may be fed through the machine per unit of time than was capable of being handled by prior art machines.

In present prior art machines utilized to accomplish the function of cutting a continuous length of wire into predetermined shorter lengths, the machines have the disadvantage of having a wire cutoff assembly which is operable at preselected periods of a cycle from a main drive mechanism by means of a mechanical clutching assembly. For lower linear wire speeds this type of clutching mechanism performs the job. However, when higher speeds are encountered, the present day mechanical clutches which are commercially available are incapable of standing the shocks upon sudden starting and stopping which were required as a result of these higher speeds. Another reason why many of the prior art machines are incapable of operating at relatively high wire feed speeds is that the knife which is carried by the wire cutoff assembly is moved through its cycle of operation by means of cams and cam followers and with springs holding the cam and cam followers into engagement. When it was desired to accommodate these aforementioned higher wire speeds, the wire cutoff assembly, along with its associated parts, has to, of necessity, travel at much higher speeds. It has been found that this type of cutoff assembly, namely, of the cam and cam follower type, has a practical upper limit as to the wire speed it can handle.

It is accordingly an object of the present invention to provide a machine which will obviate the above mentioned shortcomings of the prior art machines.

Another object of the invention is to provide a wire handling machine having a wire cutoff assembly which is driven from a crankshaft through a system of fixed linkages to do away with the cam and cam follower type of wire cutoff assembly.

Another object of the invention is to provide a wire handling machine wherein a wire cutoff assembly is provided which is driven from a crankshaft which crankshaft is controlled by an air operated clutch mechanism at one end portion thereof and an air operated brake mechanism at the other end thereof.

Another object of the invention is to provide a wire cutoff machine having a wire cutoff assembly driven by a crankshaft which is controlled by clutch and brake means with electrical circuit means for selectively controlling first and second air valves which selectively allow and prevent air flow to the clutch and brake means, respectively, and which electrical circuit means is initially energized by the wire traveling through the machine during the initial portion of a cutoff cycle and which electrical circuit means is energized during the latter portion of the cutoff cycle by an electrical switch which is controlled in accordance with the rotation of the crankshaft.

Another object of the invention is to provide a wire cutoff machine having a wire cutoff assembly driven by power linkage means which linkage means is so arranged as to exert very little force tending to move the cutoff assembly off of the support structure upon which it travels.

Another object of the invention is to provide a wire cutoff machine having a wire cutoff assembly driven by power linkage means, with the linkage means being of such construction that a lower inertia results which enables the assembly to be driven at higher speeds.

Another object of the invention is to provide power linkage means for a wire cutoff machine which enables the same to be constructed in a very simple and economical manner, with a reduction in the number of parts.

Another object of the invention is to provide a linkage means for a wire cutoff machine which utilizes a single drive link to drive both a cutoff knife and a slide head.

Other objects and a fuller understanding of this invention may be had by referring to the following description and claims, taken in conjunction with the accompanying drawings, in which:

The machine constructed in accordance with the teachings of the present invention may be referred to as one for straightening and cutting a continuous length of wire, however, it should be readily recognized that continuous lengths of material which might best be referred to as stock and which cannot be classified as wire could also be handled in this manner by the present machine. The entire machine has been illustrated in FIGURES 1 and 2 of the drawings, and has been indicated generally by the reference numeral 20. This machine includes generally a support structure 22 which might be further subdivided into a base 23 and a frame 24. The machine includes generally a straightening arbor 26, first and second feed roll assemblies 27 and 28 mounted by the base on either side of the straightening arbor, a traveling wire cutoff assembly 29, and a wire length measuring assembly 30. The arbor 26 might be of the construction shown in United States patent application Serial No. 698,812, filed November 25, 1957.

Figure 1:
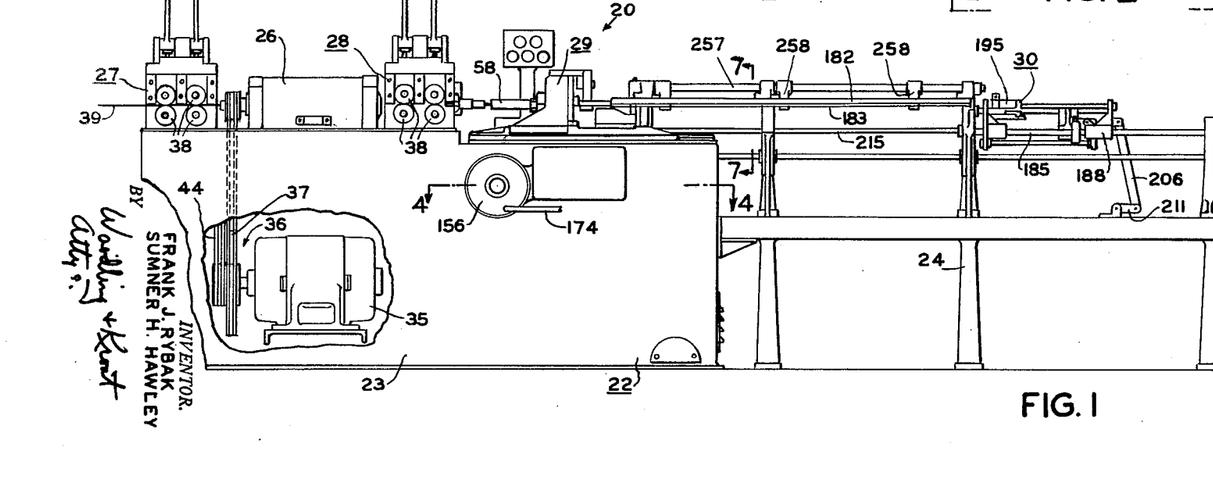
FIGURE 1 is a side elevational view of a wire handling machine constructed in accordance with the teachings of the present invention.
Figure 2:
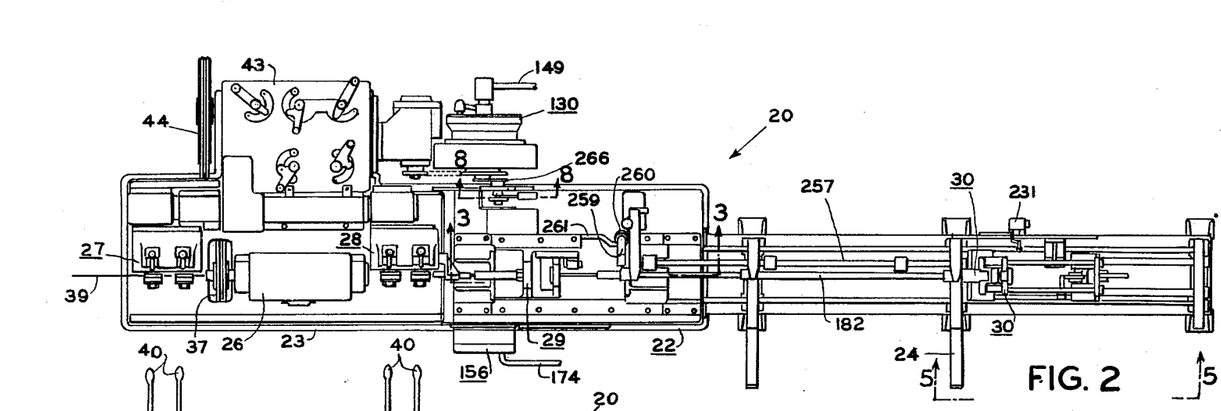
FIGURE 2 is a plan view of the machine shown in FIGURE 1.

In order to drive the machine, a motive power source has been provided which, in the instant embodiment, comprises an electric motor 35 mounted by the base 23 and drive means 36 which includes a plurality of V-belts 37 extending between the motor and straightening arbor for driving the arbor in a manner which is well known in the wire straightening art. As mentioned hereinabove, the first and second feed roll assemblies are mounted on the base at either end of the straightening arbor 26 and each of these assemblies is provided with a plurality of vertically aligned grooved drive rollers 38 between which a continuous length of wire 39 is adapted to be fed. The pressure exerted by the drive rollers 38 on the wire is determined by the relative positioning of the rollers with respect to each other and this may be varied by means of the handles 40 which operate through a camming linkage to accomplish this result. As will be noted, the wire 39 extends generally axially through the straightening arbor 26. Mounted by the base 23 is a gear box or transmission 43 which is driven by the motor 35 by means of V-belts 44. The first and second feed roll assemblies 27 and 28 are driven from the transmission by a system which has not been shown in the accompanying drawings.

Figure 3:
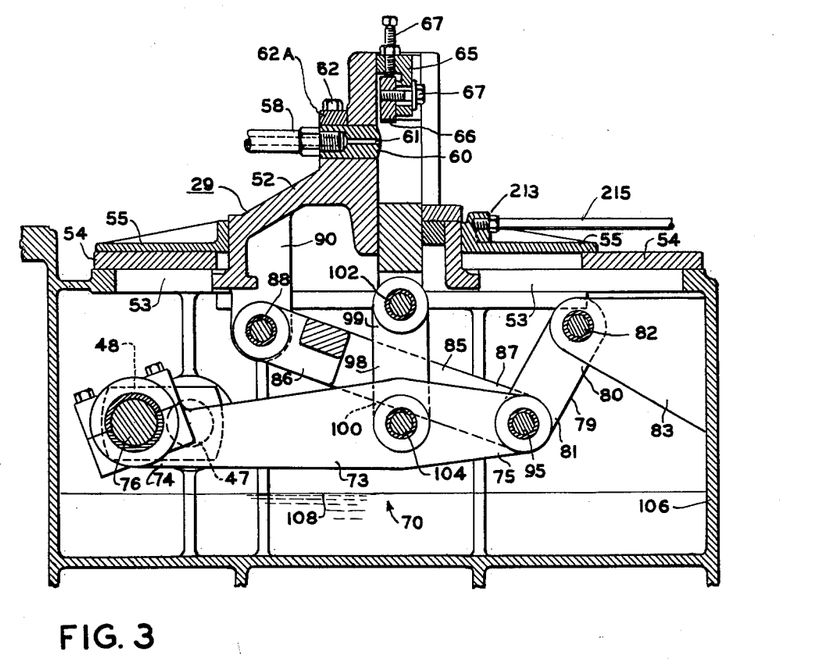
FIGURE 3 is a view taken generally along the line 3—3 of FIGURE 2.
Figure 4:
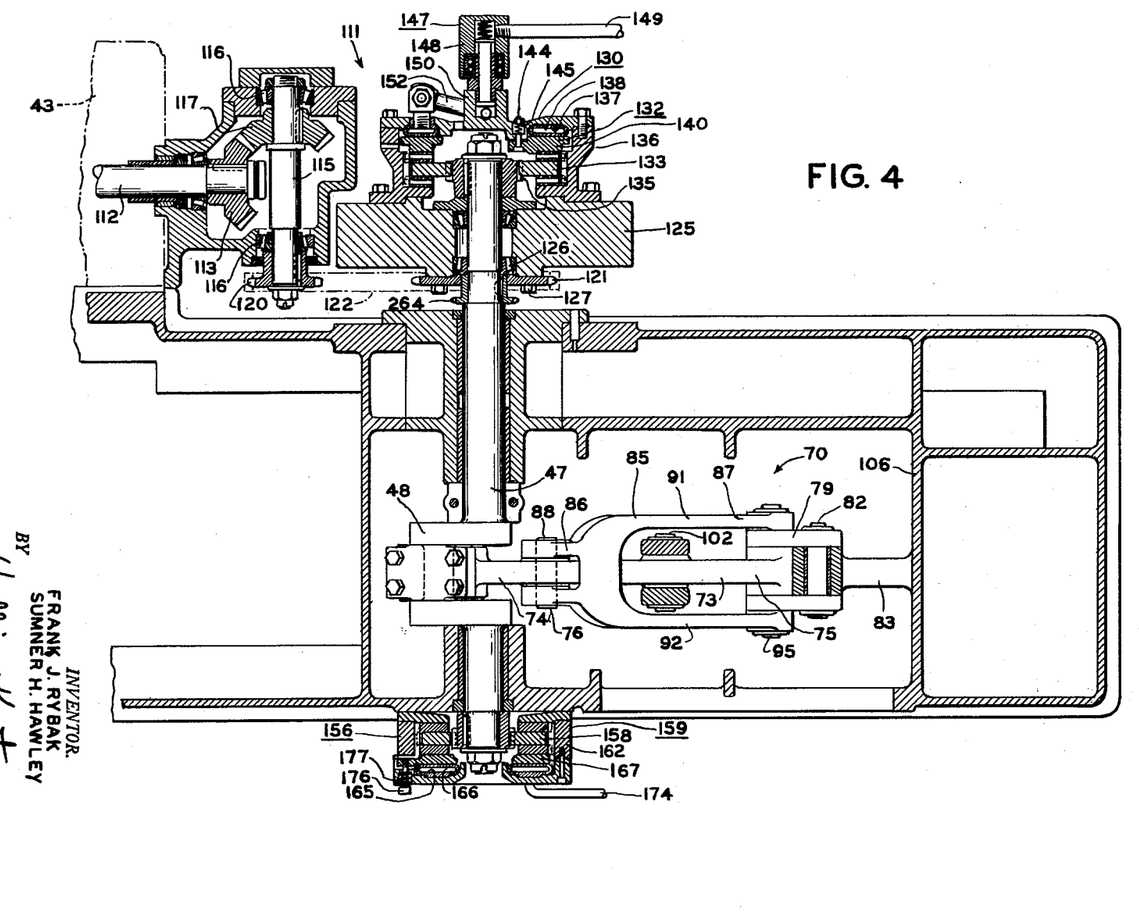
FIGURE 4 is a view taken along the line 4—4 of FIGURE 1.

The wire cutoff assembly 29, best seen in detail in FIGURES 3 and 4, is movably mounted on the base and is adapted for movement therein between first and second positions on a cutting stroke and a return stroke. The wire cutoff assembly comprises a crankshaft 47 having a crank arm 48. A cutoff slide head 52 is mounted in ways 53 for the above referred to movement on the cutting and return stroke. In the position shown in FIGURE 3, the device is in position to start on its cutting stroke. It will be noted that the cutoff slide head 52 includes way covers 55 which travel with the slide head and way covers 54 which are fixed in position over the ways. A cutoff die 60 is mounted by the cutoff slide head through clamping screws 62 and plate 62A. The die 60 has a generally horizontally disposed opening 61 coaxial with a wire guide 58 which is threadably secured to the die. The opening 61 is for the purpose of receiving the continuous length of wire after it leaves the guide 58. A knife holder 65 is slidably mounted by the cutoff slide head for movement in a generally vertical plane with a downward cutting stroke and on an upward return stroke. A knife 66 is adjustably secured in the knife holder 65 by means of two screws 67 which is illustrated in FIGURE 4 of the drawings.

Power linkage means 70 are provided to cause the cutoff slide head to travel on its cutting and return stroke and also to cause the knife carried by the knife holder to travel on its cutting and return stroke. This linkage means includes a connection link 73 having first and second end portions 74 and 75. Pivot means 76 connect the first end portion 73 of the connecting rod to the crank arm. A connecting rod link 79 is also provided which has first and second end portions 80 and 81, respectively, and pivot means 82 connect the first end portion 80 of the connecting rod link to the base by means of a mounting plate 83. A slide head drive arm 85 having first and second end portions 86 and 87, respectively, is connected at the first end portion by pivot means 88 by way of a member 90 on the cutoff slide head. It will be noted from FIGURE 4 that as the slide head drive arm progresses from the first end portion to the second end portion, it splits into two side members 91 and 92. Pivot means 95 are provided and connect the second end portions of the three members together, namely, the connecting rod, the connecting rod link and the slide head drive arm. A knife holder drive link 98 which has first and second end portions 99 and 100, respectively, is connected by the first end portion thereof by pivot means 102 to the knife holder 65. Pivot means 104 connect the second end portion of the knife holder drive link to the connecting rod 73 at a place intermediate the end portions 74 and 75 thereof. It is advantageous that pivot means 104 be located closer to the crank arm 48 than pivot means 95. It will thus be appreciated that with this power linkage means 70 that when the crankshaft be driven in a counterclockwise direction, as viewed in FIGURE 3, that because the connecting rod link is secured to the base rather than to the wire cutoff assembly and that because the knife holder drive link is secured to the connecting rod intermediate the end portions thereof or in other words inside of the pivot means 95, that as the knife travels through a cutting stroke there is very little force exerted against the cutoff slide head 52 tending to push it upwardly against and out of the ways 53 within which it slidably travels. The base of the machine is provided with wall means 105 which form a closed chamber within which the power linkage means 70 is adapted to reside. This chamber contains a lubricant for the moving parts, generally at a level indicated by the dot-dash lines 108.

FIGURE 4 best shows drive linkage means 111 which are utilized for selectively driving the crankshaft 47 from the transmission 43. This drive means includes a drive shaft 112 which extends from the transmission 43 and which has a bevel gear 113 secured to the end which extends from the transmission. A cross shaft 115 journalled at either end by bearings 116 also has a bevel gear 117 secured thereto which intermeshes with and is driven by the bevel gear 113. A sprocket 120 is fixedly secured to one end of the cross shaft 115 for rotation in accordance therewith and another sprocket 121 is mounted on the crankshaft 47 for relative rotation with respect to the crankshaft. A drive chain 122 extends between and operably connects the two mentioned sprockets 120 and 121, respectively, whereby rotative movement is transmitted to sprocket 121. A fly wheel 125 is mounted upon the crankshaft by suitable bearings 126 for relative rotation with respect thereto and is fixedly secured to the sprocket 121 by a suitable means, such as bolts 127.

Air actuated clutch means 130 are located at the end of the crankshaft adjacent the fly wheel 125 and are for the purpose of selectively transmitting the rotative movement of the fly wheel to the crankshaft 47 at predetermined intervals during a wire cutting cycle. The clutch means 130 includes a drive and a driven part 132 and 133, respectively, with the driven part 133 being rotatively fixed to the crankshaft for rotation therewith by means of a spline-like connection 135 which permits axial movement of the driven part. The drive part 132 includes a housing 136 bolted to the fly wheel 125 and to which an annular diaphragm 137 is suitably secured and the diaphragm 137 has wall means which define an air chamber 138 on one side thereof. Secured to one side of the diaphragm 137 is a metal piece 140 which has secured thereto a clutch plate. A similar clutch plate is secured to the housing 136 on the other side of the driven part 133. Secured to either side of the driven part 133 are annular clutch plates. Upon the introduction of a fluid pressure within the air chamber 138, for example air pressure, the metal piece 140 moves axially of the crankshaft toward the fly wheel 125 causing the clutch plates on the housing to engage the clutch plates on the driven part. This causes rotative movement of the fly wheel 125 to be transmitted to the crankshaft 47 by way of the connection 135. Upon the release of air pressure within the chamber 138, the metal piece 140, and as a result the clutch plate secured thereto and the driven part 133, travel in an axial direction away from the fly wheel because of a spring bias which takes the physical form of a plurality of bolts 144, only one of which is shown, which extends between the housing 136 and the metal piece 140 and which has a spring 145 urging the same axially away from the fly wheel. Air is introduced into the chamber 138 by means of a fitting 147 which permits a part 148 thereof to remain fixed and which receives an air line 149 while another part 150 is permitted to rotate with the housing 136 and fly wheel 125, and which rotating part 150 transmits the air under pressure by way of a hose 152 into the chamber 138. The air line 149 extends from a solenoid valve 153, not shown in FIGURE 4, but shown in the schematic drawing of FIGURE 9. The electric circuit means and the cycling of the solenoid valve 153 will be described hereinafter.

Brake means 156 are located at the end of the crankshaft opposite the clutch means and are for the purpose of selectively braking the crankshaft 47 to a stop. The brake means 156 includes movable and fixed parts 158 and 159, respectively. The movable part 158 is rotatively fixed to the crankshaft for rotation therewith by means of a connection which is similar to the clutch connection 135. In other words, the movable part is capable of moving axially with respect to the crankshaft, but is rotatively fixed thereto. The fixed part 159, and by fixed is meant rotatively fixed rather than being axially fixed, includes a housing 162 secured by bolts to the base and includes an annular diaphragm 165 with wall means which forms an air chamber 166. Secured to one side of the diaphragm is a metal piece 167 movable with the wall of the diaphragm to which it is affixed. Fixedly secured to the metal piece 167 is a brake plate and a similar brake plate is fixedly secured to the housing on the opposite side of the movable part 158. Fixedly secured to either side of the movable part 158 are brake plates. These brake plates have been shown, not as separate plates but as solid pieces, for better clarity in the drawings. As a result, when air is introduced into the air chamber 166 by way of an air line 174, the annular diaphragm 165 is caused to move axially to compress the respective brake plates and therefore causes the movable part 158 to be braked to a stop by the fixed part 159. Upon the release of air pressure from the chamber 166 spring means are provided which includes a plurality of bolts 176, only one of which is shown, and a spring 177 which biases the metal piece 167 and the annular diaphragm axially away from the movable part 158. The air line 174 extends to a solenoid control valve 179, which has not been shown in FIGURE 4, but which has been illustrated in the schematic drawing of FIGURE 9. The valve 179 is normally in an open position thereby permitting air to pass through the same into the air chamber 166 of the brake means. The valve 153 which controls the air to the clutch means is normally in the closed position thereby prohibiting air flow to the air chamber 138 of the clutch means. When the electric circuit is energized, which will be described hereinafter, the clutch solenoid valve is moved to the open position permitting air flow and the brake solenoid valve is moved to the closed position prohibiting air flow to the brake air chamber and exhausting the air pressure therefrom. This will be described in more detail in the operation of the instant wire handling machine.

Figure 5:
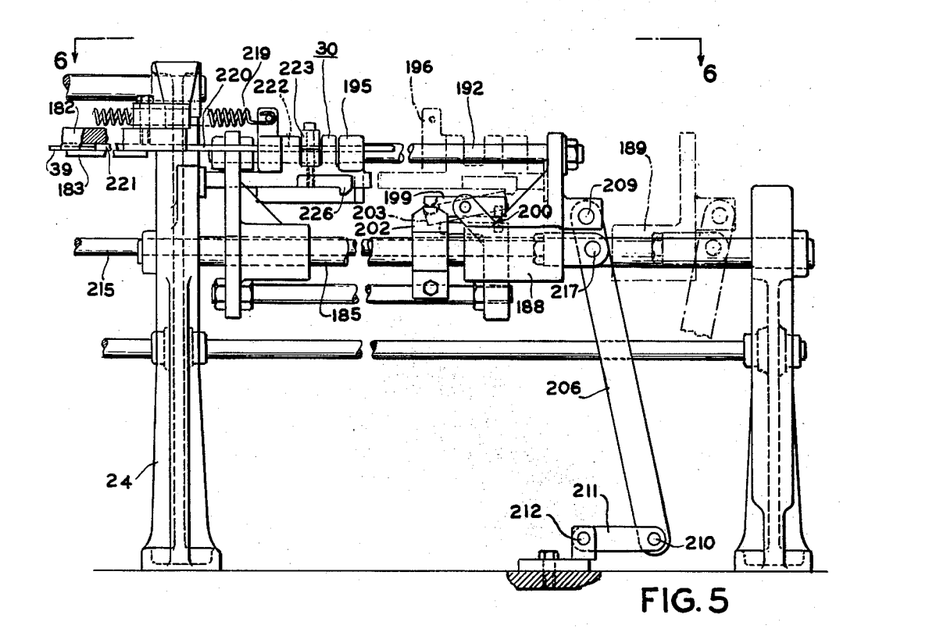
FIGURE 5 is a view taken generally along the line 5—5 of FIGURE 2 with some parts removed to better aid in understanding the invention.

The wire length measuring assembly 30 has been indicated generally in FIGURES 1 and 2 by the reference character 30 and is mounted by the frame 24 to the right of the base 23. The purpose of the wire length measuring assembly is to start the wire cutoff assembly 29 through a cutoff cycle which is done by means of the end of the wire 39 indirectly throwing an electric switch which energizes the electric circuit means which will be described in more detail hereinafter which opens the solenoid valve 153 thereby actuating the clutch means which by way of the crankshaft 47 through the power linkage means 70 causes the cutoff slide head to operate. At the same time the valve 179 is closed and the brake means is deactuated. The time at which the end of the wire causes the above referred to switch to energize the electric circuit means determines the time when the cutoff slide head is actuated and, therefore, determines the length of the wire which is cut. The structure which makes up the wire length measuring assembly 30 comprises a guide bar or tube member 182 fixedly secured to the frame 24 and which has an opening extending the entire length on a lower side thereof. A cover or clapper bar 183 normally closes the opening. The wire 39, after it passes through the cutoff slide head, enters the guide bar 182 through the left end thereof, as viewed in FIGURES 1 and 2. Outwardly of the clapper bar 182 (FIGURES 5 and 6) or to the right thereof, first and second guide rods 185 and 186 are mounted by the frame 24 and a lower slide 188 is mounted on these two guide rods for movement between first and second positions. The full line drawings shows the lower slide in the first position and the dot-dash line position 189 shows the lower slide as being in the second position. This lower slide includes first and second parts which are secured together by three rods, the upper two of which might be referred to as third and fourth guide rods 192 and 193. These third and fourth guide rods are adapted to mount an upper slide 195 which is adapted for movement between first and second positions relative to the lower slide. The full line drawing indicates the upper slide 195 as being in the first position whereas the dot-dash line position 196 indicates the upper slide 195 in its second position. A latch member 199 is carried by the lower slide and is biased by a spring 200 to a normally latched condition. An unlatching member 202 is carried by the frame 24 and is in the shape of a rectangular plate and is located in such a position that when the lower slide is in the above referred to first position it maintains the latch in an unlatched condition. The unlatched condition is shown in the full line drawing in FIGURE 5, whereas the latched position is shown in the dot-dash position 203. The lower slide 188 is adapted to be driven in its movement between the above referred to first and second positions by the movement of the wire cutoff assembly 29. The lower slide is adapted to travel a slightly greater distance than the wire cutoff assembly for a reason to be described hereinafter and by means of the following described structure. This structure includes a lower slide drive link 206 which has first and second end portions, with the first end portion of this link being secured to the lower slide by pivot means 209, and with the second end portions of this link being secured by pivot means 210 to a lower connecting link 211 which, in turn, is secured by pivot means 212 to a portion of the frame 24. A lower slide drive rod 215 has first and second end portions and a means 213 is provided for connecting the first end portion of this drive rod to the wire cutoff assembly so that this end moves in accordance therewith. Pivot means 217 connect the second end portion of the lower slide drive rod to the lower slide drive link 206 between the first and second end portions thereof and because of this connection, it will be seen that the pivot means 209 travels further than the pivot means 217, as shown in the dot-dash position 189, which also means that the lower slide travels a slightly greater distance than the wire cutoff assembly.

A spring member 219 normally biases the upper slide to the above mentioned first position. A gauge rod 220 is adjustably fastened at one end portion 222 to the upper slide as at 223 and serves the purpose of moving the upper slide from its first toward its second position. The other end portion 221 of the gauge rod 220 extends into the left end of the guide bar 182 into a position to be engaged by the end of the wire 39 as it travels within the opening therein. A latch shoulder 226 is carried by the upper slide to engage the latch member 199 carried by the lower slide upon movement of the upper slide toward its above referred to second position. The timing is such that the upper and lower slides are latched together just prior to the knife 66 (FIGURE 3) cutting the wire 39. If the two are connected together this means that the wire and the cutoff assembly are traveling at the same speed. A switch actuating projection 230 is carried by the upper slide in its movement between the first and second positions and is adapted to throw a first electrical switch 231 by engagement with a switch arm 232 and this switch causes the electric circuit, shown in FIGURE 9, to be energized. The return travel of the upper slide from the second to the first position does not serve to affect this switch because the switch arm is pivoted, as at 233, and this pivoted connection permits movement of the art in a clockwise direction about the pivot 233 and does not permit movement in a counterclockwise direction.

After the cutoff assembly has been actuated through a cutoff operation it is necessary to remove the cut piece of wire from the opening in the guide bar 182. The structure utilized to carry out this function is shown in FIGURES 1 and 2 and is shown in more detail in FIGURE 7. This structure includes a rod 257 journalled for rotation by the frame 24. Extending from the rod 257 and fixedly secured thereto are a plurality of arms 258 which are secured to the clapper bar or cover 183. Also secured to the rod 257 is an arm 259 having a roller type cam follower 260 located adjacent the wire cutoff assembly 29. A cam member 261 is carried by the cutoff assembly and is adapted to engage and move the follower 260. When the follower 260 is moved (FIGURE 7) the rod 257 is rotated in a counterclockwise direction and the arms 258 are moved to the dot-dash position 262 at which position the cut piece of wire drops from the guide bar preferably into a suitable receptacle.

Figure 8:
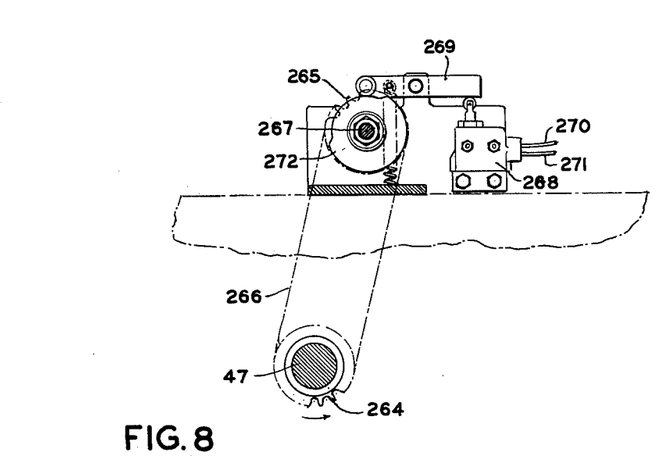
FIGURE 8 is a view taken generally along the line 8—8 of FIGURE 2.

Secured to the crankshaft 47 (FIGURES 4 and 8) for rotation therewith is a sprocket 264 which drives a second sprocket 265 through the agency of a drive chain 266. A rotary cam 272 is rotatably mounted by a shaft 267 which is driven by sprocket 265. The cam 267 controls switch 268 through a spring biased lever 269. The conductors 270 and 271 lead to the electric control circuit and the switch in the position shown is in the open position. The operation of this will be described in more detail in the discussion of FIGURE 9 which is a schematic view of the control system of the machine.

Figure 6:
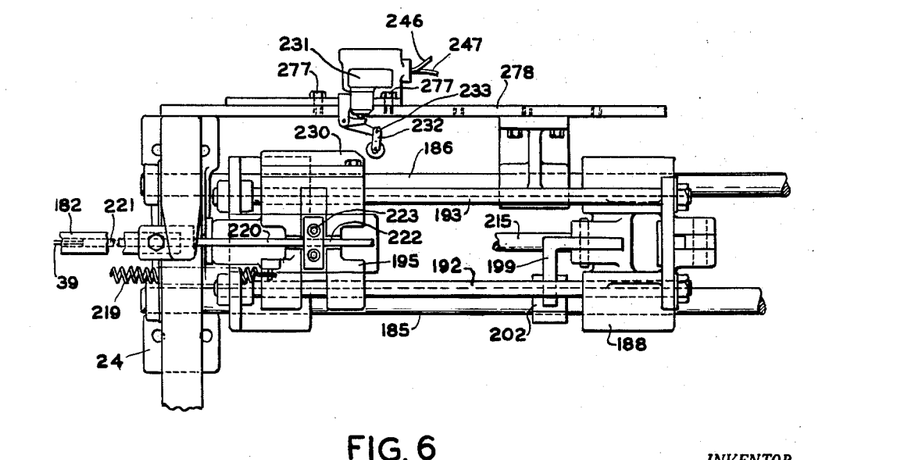
FIGURE 6 is a view taken generally along the line 6—6 of FIGURE 5.
Figure 9:
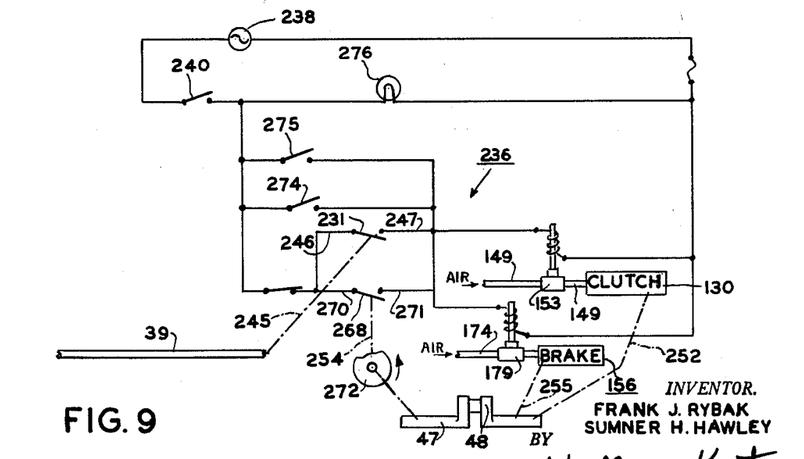
FIGURE 9 is a schematic drawing showing the electrical circuit means for causing the wire cutoff assembly to move through a cycle of operation and the various elements which serve to energize and de-energize the electrical circuit means.

Referring to FIGURE 9, the electric circuit means which has been referred to hereinabove has been indicated generally by the reference numeral 236 and includes an alternating power source 238 which might be a direct current power source. A manual switch 240 serves to energize the circuit means which includes the two solenoid valves 153 and 179 which are arranged in parallel with each other. The energization of these two valves 153 and 179 are controlled by means of the first electrical switch 231 (FIGURES 2 and 6), referred to hereinabove, and the second electrical switch 268. This means upon the control switch 240 being thrown to initially turn the power on the machine that when either of the switches 231 or 268 is closed, then the two solenoid valves 153 and 179 are energized. As mentioned hereinabove, the valve 153 is normally closed and when the electrical circuit is energized, this valve opens whereas the valve 179 is normally open and upon the energization of the electrical circuit means, this valve is moved to its closed position. The mechanical clutching connection between the clutch and the crankshaft 47 has been shown only schematically in FIGURE 9 by means of the dot-dash line 252 while the connection between the brake and crankshaft has been indicated by dot-dash line 255. The mechanical connection between the end of the wire 39 and the switch 231 has been indicated by the dot-dash line 245 whereas the actual connection as shown in FIGURE 6 is by way of the gauge rod 220, the upper slide 195 and the projection 230. A manual operator actuated cutoff switch 274 and an automatic run switch 275 have been placed in the circuit to enable one to bypass the switches 231 and 268 and operate the machine and wire cutoff assembly continuously or at will. A lamp 276 is placed in the circuit to enable an operator to see when the circuit is energized.

The operation of the machine is generally as follows. The end of a reel of wire is initially fed between the feed rolls of the first feed roll assembly 27, through the straightening arbor 26 and between the feed rolls of the second feed roll assembly 28. The feed roll pressure on the wire is controlled by means of the handles 40. From the second feed roll assembly 28, the wire is fed into the wire guide 58 and through the cutoff die 60 of the wire cutoff assembly 29. From here the wire is fed into the left end of the tube member 182 and from here it is in position in its travel to engage the left end of the gauge rod 220. Energization of the motor 35 causes rotation of the arbor 26 and driving of the first and second feed roll assemblies 27 and 28. This causes the wire to travel through the wire cutoff assembly 29 and into the left end of the tube member 182. Switch 240 is thrown energizing the electric circuit 236 (FIGURE 9) which is also tied into the motor control circuit (not shown) and must be closed before the motor 35 can be energized. In its travel in the tube member 182, the wire 39 engages the left end 221 of the gauge rod 220 and causes the upper slide 195 to move from its first position (full line drawing of FIGURE 5) toward its second position. In this travel, the projection 230 on the upper slide engages the arm 232 on the first electric switch 231 and causes the electric valves 153 and 179 to be energized. This is best seen in the schematic drawing of FIGURE 9 wherein the wire 39 as mentioned hereinabove, has been shown schematically connected to the first electric switch 231 by means of the dot-dash line 245. Still referring to FIGURE 9, it will be seen that energization of solenoid valve 153 causes this normally closed valve to open and admit air to the clutch means 130 by way of line 149 which causes the crankshaft 47 to rotate and thereby drive the wire cutoff assembly through a cutoff cycle by way of the power linkage means 70. The operative connection between the clutch means 130 and the crankshaft 47 in FIGURE 9 has been indicated by the dot-dash line 252. Rotation of the crankshaft 47 (FIGURE 8) causes rotation of the cam 272 by means of the sprockets 264 and 265 and chain 266. Continued movement of the wire in engagement with the left end of the gauge rod 220 finally causes the projection 230 carried by the upper slide to bypass the arm 232 at which time the switch 231 moves to the open position. However, by the time this has taken place, the cam 272 has rotated through a sufficient number of degrees by means of being driven by the crankshaft 47 so that the raised portion of the cam serves to close switch 268 by means of the lever 269. Therefore, when switch 231 moves to the open position, switch 268 is in the closed position and the solenoid valves are still energized. Energization of the solenoid valve 153, as mentioned hereinabove, also causes energization of the solenoid valve 179. The valve 179 is normally in the open position thereby admitting air under pressure to the brake means 156 and as soon as the solenoid valve 179 is energized, this causes air to be shut off from this brake means and to be exhausted therefrom. When the crankshaft has gone through one complete revolution, the cam 272 again assumes the position shown in FIGURE 9. When the lever 269 moves off of the raised portion to the lower portion, the switch 268 is caused to move to its normally open position thereby de-energizing the solenoid valves 153 and 179. This de-actuates the clutch and actuates the brake means 156 which serves, by way of the schematic mechanical connection 255, to arrest rotation of the crankshaft 47.

Figure 7:
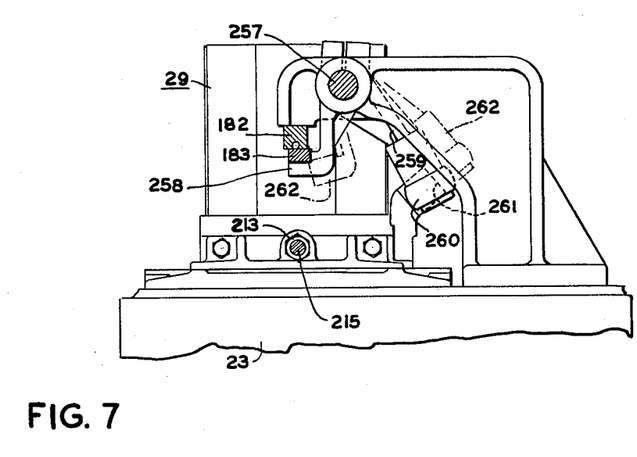
FIGURE 7 is a view taken generally along the line 7—7 of FIGURE 1.

During a cutoff operation as described hereinabove, the end of the wire traveling through the tube member 182 causes movement of the upper slide 195 from the first to the second position. When the switch 231 is thrown indirectly by the movement of the wire by way of the upper slide, rotational movement is transmitted to the crankshaft 47 and from there by way of the power linkage means 70 to the cutoff slide head 52 which starts it through a cycle of operation. Movement of the cutoff slide head 52 toward the wire length measuring assembly 30, in its cycle of operation, causes movement to be transmitted to the lower slide 183 by way of the lower slide drive rod 215. The initial movement of the upper slide relative to the lower slide is much more rapid and, as a result, the upper slide overtakes the lower slide and becomes attached thereby by means of the latch shoulder 226 engaging the latch member 199. One of the reasons for this is that it is desirable, as will be discussed hereinafter, to cause the gauge rod 220, particularly the left end thereof which is in engagement with the wire 39, to move a slightly greater distance than this wire does. The reason for this is that after the knife 66 has severed the continuous length of wire into a predetermined length, it will be seen that one end of this severed wire is in engagement with the left end of the upper slide drive rod and the other end of the severed length is in engagement with the face of the cutoff die 60. It is necessary that this severed piece of wire, in effect, be unwedged between these two members. As a result, the upper slide drive rod is pulled a slight distance further as described hereinabove by means of the latching of the upper and lower slides together. During the cutting operation the wire in the guide bar is supported by the clapper bar to give a square cut and when the cutting operation has been completed the clapper bar is swung into the dot-dash position 262 by the movement of the cam 261 which is attached to the cutoff head, as it engages the cam roller 260 (FIGURE 7). The severed piece of wire then drops from the guide bar into a suitable container (not shown). The latching of the upper and lower slides together is synchronized to occur just prior to the knife cutting the wire 39. The reason for this is to insure that the linear travel of the cutoff head and the wire are the same when the knife is cutting the wire. If it is desired to cut the same size and diameter wire but in longer or shorter lengths (within limits) it is only necessary to move the gauge rod 220 further into the opening in the guide bar 182 or closer to the right end of the guide bar 182 depending on whether shorter or longer pieces of wire are desired.

In the event the linear speed of the wire is cut down, for example when a smaller wire size is being cut, and it is desired to cut the same length of wire, adjustment may be made by moving switch 231 (FIGURE 6) further to the right by means of the bolts 277 and plate 278. The position of switch 231 effectively determines when the cutoff head and knife are actuated and insures latching of the upper and lower slides together which is necessary to maintain accurate wire lengths and to allow the cut lengths of wire to fall freely out of the opening in the guide bar. Machines adapted to accomplish the function of cutting a continuous length of stock into predetermined shorter lengths may be classified under two primary classes, namely, those which are constructed without clutches and those constructed with clutches, for example, mechanical and electrical clutches. The clutches are for the purpose of actuating a wire cutting mechanism through a cycle at preselected intervals. In the machines having clutches there are several tripping systems whereby a signal is transmitted to engage and disengage the clutch which controls the cycle of the wire cutting mechanism. The tripping might, for example, be of the mechanical or pneumatic type. Regardless of the type of machine described hereinabove, whether of the clutch or clutchless type, it should be readily appreciated by those skilled in the art that the wire cutoff assembly and power linkage means of the present invention might be as readily adapted to one as to the other without reference to the tripping and control features herein disclosed.

Figure 10:
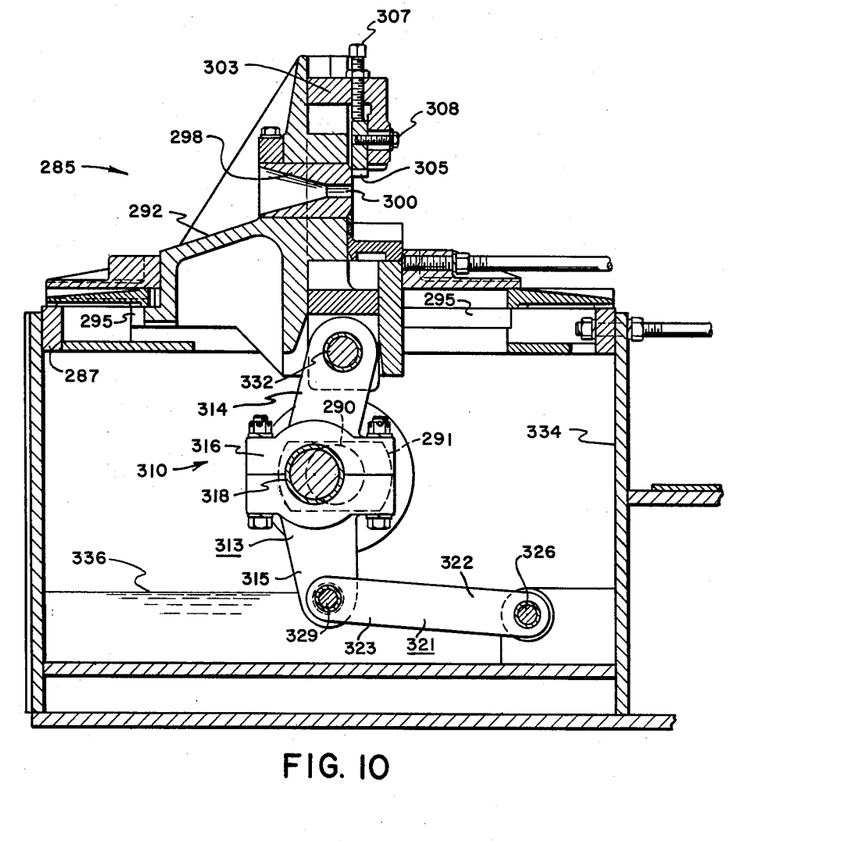
FIGURE 10 is a view similar to FIGURE 3, but showing a modified form of the traveling wire cutoff assembly.

The wire cutoff assembly shown in FIGURE 10 is indicated generally by the reference numeral 285 and is a modification of the assembly shown in FIGURE 3. The base of the machine in FIGURE 10 has been indicated by the reference numeral 287 and the wire cutoff assembly 285 is adapted for movement on the base between first and second positions on a cutting stroke and a return stroke. This assembly comprises a crankshaft 290 and a crank arm 291 is connected to and driven by the crankshaft. A cutoff slide head 292 is mounted in ways 295 to permit the above referred to movement on the cutting and return strokes. A cutoff die 298 is mounted by the slide head 292 and has an opening 300 extending therethrough, through which wire which is to be cut off is adapted to extend. A knife holder 303 is provided and is slidably mounted by the cutoff slide head 292 for movement in a generally vertical plane on a downward and an upward return stroke. A cutoff knife 305 is adjustably secured to the upper portion of the knife holder 303 by means of screws 307 and 308.

Power linkage means 310 are provided and serve to transmit power from the crank arm 291 to the cutoff slide head 292 and the knife holder 303. This power linkage means includes a drive link 313 having first and second end portions 314 and 315 respectively as well as an intermediate portion 316 therebetween. Pivot means 318 serve to connect the intermediate portion 316 of the drive link to the crank arm 291. A support link 321 is also provided which has first and second end portions 322 and 323 respectively and pivot means 326 serve to connect the first end portion 322 to the base 287, and pivot means 329 connect the second end portion 323 of the support link to the second end portion 315 of the drive link. Pivot means 332 serve to pivotally connect the first end portion 314 of the drive link 313 to the lower portion of the knife holder 303 shown, and as a result of the construction, connects the drive link to the cutoff slide head 292. The knife holder 303 has what may be referred to as an opening or hole therein to accommodate the cutoff die 298 and still provide connection between the drive link 313 and the knife 305.

The wire cutoff assembly, as in the modification shown in FIGURE 3, also includes a wall means 334 which define a lubricating chamber within which the linkage means 310 resides. The lubricating chamber is adapted to contain lubricating oil at a preferred level indicated by the reference numeral 336.

The operation of the assembly 285 shown in FIGURE 10, assuming that the crankshaft 290 is driven in a counterclockwise direction, is that the crank arm is also driven in this counterclockwise direction. Taking FIGURE 10 as a starting position, rotation of the crank arm through the first 180° of counterclockwise rotation causes the slide head to travel from its extreme left position to its extreme right position and the movement of the crank also causes the cutoff knife 305 carried by the knife holder to travel down past the opening 300 in the cutoff die 298 to sever a wire extending therethrough. This of course happens at the time that the cutoff slide head is traveling. It will be noted that because of the interconnection of the first end portion 314 of the drive link with the knife holder 303 that this end, because of the horizontal extremes of the crank throw causes the slide head to move between its extreme positions and the two vertical extremes of the crank throw causes the knife and knife holder to travel between its two extreme positions. It will be noted that the maximum velocity in the system exists only along the wire line where it is desired. This feature along with the use of the minimum number and weight of parts make possible a mechanism of very low inertia that is necessary for high speed production. The construction which enables the single drive link and its connections to drive both the cutoff slide and the knife holder is also a substantial improvement in the mechanism.

This application is a continuation in part of United States patent application Serial No. 731,498, filed April 28, 1958, now abandoned.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A wire cutoff assembly for cutting wire into predetermined lengths comprising in combination, a base, a crankshaft having a crank arm, a cutoff slide head mounted in ways on said base for back and forth movement on a cutting and return stroke, a cutoff die mounted by said cutoff slide head and having a generally horizontally disposed opening for the reception of the wire, a knife holder slidably mounted by said cutoff slide head for movement in a generally vertical plane on a downward cutting stroke and an upward return stroke, power linkage means interconnecting said crank arm to said slide head and said knife holder for driving the same through said respective movements, said linkage means including a connecting rod having first and second end portions, pivot means connecting said first end portion of said connecting rod to said crank arm, a connecting rod link having first and second end portions, pivot means connecting said first end portion of said connecting rod link to said base, a slide head drive arm having first and second end portions, pivot means connecting said first end portion of said slide head drive arm to said cutoff slide head, pivot means connecting said second end portions of said connecting rod, said connecting rod link and said slide head drive arm together, a knife holder drive link having first and second end portions, pivot means connecting said first end portion of said knife holder drive link to said knife holder, pivot means connecting said second end portion of said knife holder drive link to said connecting rod intermediate said first and second end portions thereof, wall means defining a lubricating chamber within which said linkage means resides which chamber is adapted to contain lubricant for the lubrication of said linkage means.

2. A wire cutoff assembly for cutting wire into predetermined lengths comprising in combination, a base, a crank shaft having a crank arm, a cutoff slide head mounted for back and forth movement on a cutting and return stroke, a cutoff die mounted by said cutoff slide head and having an opening for the reception of the wire, a knife holder slidably mounted by said cutoff slide head for movement on a cutting stroke and a return stroke, power linkage means interconnecting said crank arm to said slide head and said knife holder for driving the same through said respective movements, said linkage means including a connecting rod having first and second end portions, pivot means connecting said first end portion of said connecting rod to said crank arm, a connecting rod link having first and second end portions, pivot means connecting said first end portion of said connecting rod link to said base, pivot means connecting said second end portions of said connecting rod and said connecting rod link together, a slide head drive arm having first and second end portions, pivot means connecting said first end portion of said slide head drive arm to said cutoff slide head, pivot means connecting said second end portion of said slide head drive arm to said connecting rod, a knife holder drive link having first and second end portions, pivot means connecting said first end portion of said knife holder drive link to said knife holder, and pivot means connecting said second end portion of said knife holder drive link to said connecting rod intermediate said first and second end portions thereof.

3. In a machine for cutting stock into predetermined lengths and including a base and a slide head with a cutting knife driven from a crank, the improvement of linkage means between the crank and the slide head for driving the slide head and the cutting knife through a cycle, said linkage means comprising in combination, a connecting rod pivotally connected at one end portion to said crank, a connecting rod link pivotally connected at one end portion to said base and pivotally connected at the other end portion to the other end portion of said connecting rod, a slide head drive arm pivotally connected at one end portion to said slide head and pivotally connected at the other end portion to the other end portion of said connecting rod, and a knife drive link pivotally connected at one end portion to said knife and pivotally connected at the other end portion to said connecting rod.

4. A wire cutoff assembly for cutting wire into predetermined lengths comprising in combination, a base, a crankshaft having a crank arm, a cutoff slide head mounted in ways on said base for back and forth movement on a cutting and return stroke, a cutoff die mounted by said cutoff slide head and having a generally horizontally disposed opening for the reception of the wire, a knife holder slidably mounted by said cutoff slide head for movement in a generally vertical plane on a downward cutting stroke and an upward return stroke, power linkage means interconnecting said crank arm to said slide head and said knife holder for driving the same through said respective movement, said linkage means including a drive link having first and second end portions and an intermediate portion therebetween, pivot means connecting said intermediate portion of said drive link to said crank arm, a support link having first and second end portions, pivot means connecting said first end portion of said support link to said base, pivot means connecting said second end portion of said support link to said second end portion of said drive link, pivot means connecting said first end portion of said drive link to said knife holder and to said slide head to respectively drive same on their upward and downward strokes and back and forth movement, wall means defining a lubricating chamber within which said linkage means resides which chamber is adapted to contain lubricant for the lubrication of said linkage means.

5. A wire cutoff assembly for cutting wire into predetermined lengths comprising in combination, a base, a crankshaft having a crank arm, a cutoff slide head mounted in ways on said base for back and forth movement on a cutting and return stroke, a cutoff die mounted by said cutoff slide head and having a generally horizontally disposed opening for the reception of wire, a knife holder slidably mounted by said cutoff slide head for movement in a generally vertical plane on a downward cutting stroke and an upward return stroke, power linkage means interconnecting said crank arm to said slide head and said knife holder for driving the same through said respective movements, said linkage means including a drive link having first and second end portions and an intermediate portion therebetween, pivot means connecting said intermediate portion of said drive link to said crank arm, a support link having first and second end portions, pivot means connecting said first end portion of said support link to said base, pivot means connecting said second end portion of said support link to said second end portion of said drive link, pivot means connecting said first end portion of said drive link to said knife holder and to said slide head, wall means defining a lubricating chamber within which said linkage means resides which chamber is adapted to contain lubricant for the lubrication of said linkage means.

6. A wire cutoff assembly for cutting wire into predetermined lengths comprising in combination, a base, a crankshaft having a crank arm, a cutoff slide head mounted in ways on said base for back and forth movement on a cutting and return stroke, a cutoff die mounted by said cutoff slide head and having a generally horizontally disposed opening for the reception of the wire, a knife holder slidably mounted by said cutoff slide head for movement in a generally vertical plane on a downward cutting stroke and an upward return stroke, power linkage means interconnecting said crank arm to said slide head and said knife holder for driving the same through said respective movements, said linkage means including a drive link having first and second end portions and an intermediate portion therebetween, pivot means connecting said intermediate portion of said drive link to said crank arm, a support link having first and second end portions, pivot means connecting said first end portion of said support link to said base, pivot means connecting said second end portion of said support link to said second end portion of said drive link, and pivot means connecting said first end portion of said drive link to said knife holder and to said slide head.

7. A wire cutoff assembly for cutting wire into predetermined lengths comprising in combination, a base, a crankshaft having a crank arm, a cutoff slide head mounted on said base for back and forth movement, a knife holder slidably mounted by said cutoff slide head for movement on a downward cutting stroke and an upward return stroke, power linkage means interconnecting said crank arm to said slide head and said knife holder for driving the same through said respective movements, said linkage means including a drive link having first and second end portions and an intermediate portion therebetween, pivot means connecting said intermediate portion of said drive link to said crank arm, a support link having first and second end portions, pivot means connecting said first end portion of said support link to said base, pivot means connecting said second end portion of said support link to said second end portion of said drive link, and pivot means connecting said first end portion of said drive link to said knife holder and to said slide head.

8. A cutoff assembly comprising in combination, a base, a crank arm, a cutoff slide head mounted by said base for movement on a cutting and return stroke, a knife holder slidably mounted by said cutoff slide head for movement on a cutting stroke and a return stroke, power linkage means interconnecting said crank arm to said slide head and said knife holder for driving the same through said respective movements, said linkage means including a drive link having first and second end portions and an intermediate portion therebetween, pivot means connecting said intermediate portion of said drive link to said crank arm, a support link having first and second end portions, pivot means connecting said first end portion of said support link to said base, pivot means connecting said second end portion of said support link to said second end portion of said drive link, and pivot means connecting said first end portion of said drive link to said knife holder and to said slide head.

9. A cutoff assembly comprising in combination, a base, a crank arm, a cutoff head mounted by said base, a knife holder slidably mounted by said cutoff head for movement on a cutting stroke and a return stroke, power linkage means interconnecting said crank arm to said head and said knife holder for driving the same through said movements, said linkage means including a drive link, pivot means connecting said drive link to said crank arm, a support link having first and second end portions, pivot means connecting said first end portion of said support link to said base, means operably connecting said second end portion of said support link to said drive link, and pivot means connecting an end portion of said drive link to said knife holder and to said slide head.

10. A cutoff assembly comprising in combination, a base, a crank arm, a cutoff head mounted by said base, a knife holder slidably mounted by said cutoff head for movement on a cutting stroke and a return stroke, power linkage means interconnecting said crank arm to said head and said knife holder for driving the same through said movements, said linkage means including a drive link, pivot means connecting said drive link to said crank arm, a support link having first and second end portions, pivot means connecting said first end portion of said support link to said base, means operably connecting said second end portion of said support link to said drive link, and means including pivot means connecting a portion of said drive link to said knife holder and to said slide head.

References Cited in the file of this patent

UNITED STATES PATENTS

| 794,095 | Goble | July 4, 1905 |
| 1,569,569 | Pels | Jan. 12, 1926 |
| 1,841,967 | Long | Jan. 19, 1932 |
| 2,675,076 | Billeter | Apr. 13, 1954 |
| 2,797,752 | Marano | July 2, 1957 |

FOREIGN PATENTS

| 877,582 | Germany | May 26, 1953 |